G. H. TARVIN.
SHOCK LOADER.
APPLICATION FILED FEB. 28, 1914.
1,189,211.
Patented June 27, 1916.
2 SHEETS—SHEET 1.
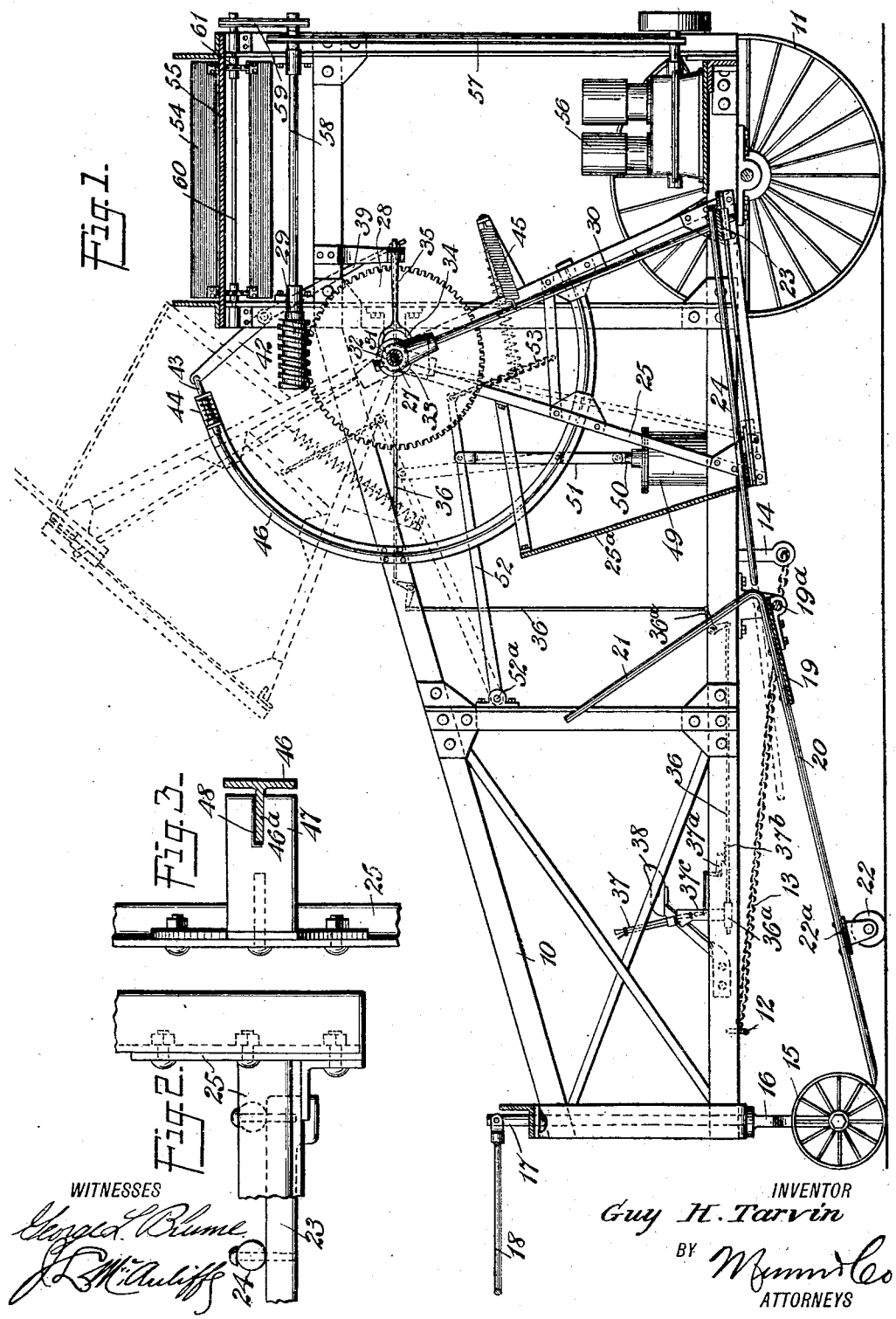
WITNESSES
INVENTOR
Guy H. Tarvin
BY
ATTORNEYS

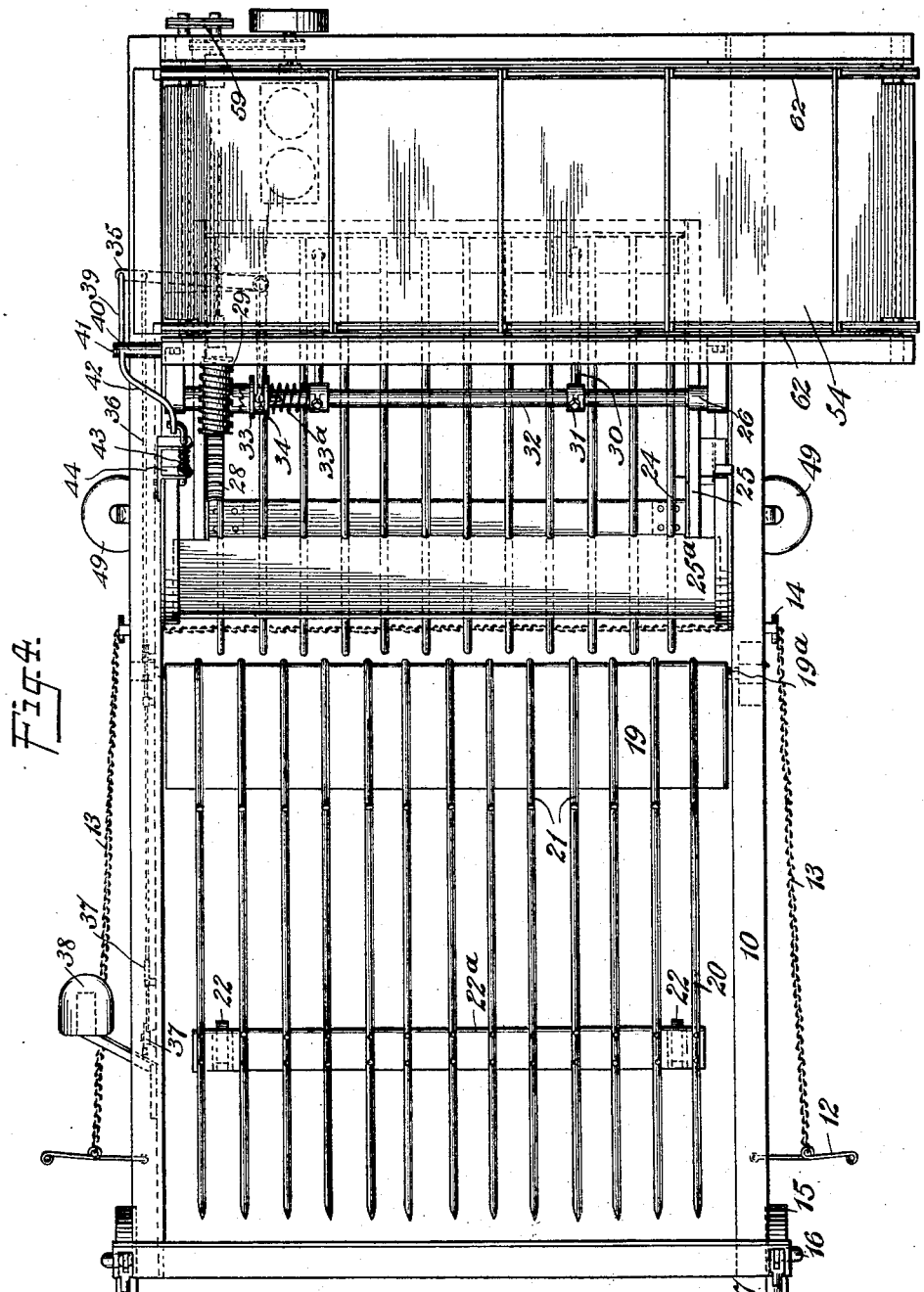

UNITED STATES PATENT OFFICE.

GUY H. TARVIN, OF SISSETON, SOUTH DAKOTA.

SHOCK-LOADER.

1,189,211. Specification of Letters Patent. Patented June 27, 1916.

Application filed February 28, 1914. Serial No. 821,767.

*To all whom it may concern:*

Be it known that I, GUY H. TARVIN, a citizen of the United States, and a resident of Sisseton, in the county of Roberts and State of South Dakota, have invented a new and Improved Shock-Loader, of which the following is a full, clear, and exact description.

My invention relates to a loader adapted to gather shocks of hay or grain, and deliver the same to a wagon.

The invention more particularly is an improvement on a shock loader forming the subject matter of United States Patent No. 1008217, granted to me November 7, 1911. In the said patented loader a pick-up fork is provided, together with a second fork arranged in connection with a swinging frame, the second fork being adapted to take the material from the pick-up fork.

The present invention has for an object to provide a loader of the indicated character having a novel and effective arrangement of the principal elements, particularly with respect to the second fork, together with the means for controlling the operations of the fork and its swinging frame, as well as means for conveying the material laterally to be discharged to a wagon.

The invention has also for its object to improve the loader in various particulars, to the end that simplicity of construction, as well as efficiency in operation may be promoted.

The invention will be particularly explained in the specific description following.

Reference is to be had to the accompanying drawings forming a part of this specification, in which similar characters of reference indicate corresponding parts in all the views.

Figure 1 is a longitudinal vertical section of a loader embodying my invention; Fig. 2 is a fragmentary detail showing the construction of the lower portion of the swinging frame and the second fork. Fig. 3 is a fragmentary detail in sectional plan view, showing the guiding means for the swinging frame; and Fig. 4 is a plan view of a loader embodying my invention.

In constructing a practical embodiment of the loader in accordance with the illustrated example, a vehicle is provided, comprising a frame or body 10 having running wheels 11 supporting the rear end. Draft devices 12 are arranged at each side near the front and desirably are connected by a chain 13, which may move in any suitable guides 14, here shown as hangers. In order to guide the machine caster wheels 15 are provided at the front, which are illustrated in the present instance as mounted in forks, 16, on standards 17 that are mounted to turn in the frame 10, the upper ends of the standards being connected by a suitable neck yoke 18.

On the frame 10 is mounted a pick-up fork 19, which is pivoted, as at 19ª, for vertical rocking movement. In addition to the forwardly extending and downwardly inclined, pick-up tines 20, retaining tines 21 are provided at the rear end of the fork, and may be in the form of continuations of the tines 20, as shown. Near the front end the pick-up fork may have supporting wheels or rollers 22, here shown as secured to a cross bar 22ª.

In the rear of the pick-up fork is a second fork comprising a head 23 and forwardly-extending tines 24. Said second fork is carried by a frame 25 and has sliding movement therein. The frame 25 is in the form of a suspended hanger, being hung by bearings 26 at the upper end thereof on a transverse shaft 27. Mounted loosely on the shaft 27, in the present example, is a worm wheel 28, a worm 29 meshing with said wheel and being driven in a manner hereinafter explained.

In order to slide the fork 24 forwardly, to take the material from the pick-up fork 20, rods 30 are provided, which are secured by their collars 31 or equivalent means to a hollow shaft 32 surrounding the drive shaft 27. In connection with the hollow shaft 32 and the worm wheel 28, a clutch 33 is employed, controlled by a shifting fork 34 on a bell crank lever 35. A spring 33ª tends to normally hold the clutch in engagement, and means are provided, as hereinafter described, for automatically releasing the clutch against the action of the said spring. To hold the clutch in the open position when automatically released, lever and link members 36, 36ª extend from the bell crank levers 35 to a point adjacent to a lever 37 carrying a pawl 37ª which is adapted to engage ratchet teeth 37ᵇ on the adjacent link 36, said link member having a sliding movement in the bearing 36ª on the base 37ᶜ, to which the lever 37 is secured. The lever is positioned adjacent to a seat 38 at one side of the machine, and by throwing the lever the driver may rock the pawl 37ª out of engagement with the ratchet teeth 37ᵇ, and permit the spring 33ª to throw the clutch 33 into the clutching position with the worm wheel 28. In order to release the clutch automatically by the upward movement of the swinging frame 25, an arm 39 connects at one end with the bell crank lever 35, said arm being mounted on a sleeve 40, turning on a stud shaft 41, from which sleeve a second arm 42 extends to a spring-pressed trip 43, suitably mounted in the path of the swinging frame 25, as by a bracket 44. The trip 43, when engaged by the frame 25, will rock the sleeve 40 and throw the bell crank lever 35 to the releasing position.

When the clutch is in engagement, the turning of the worm wheel 28 will turn the hollow shaft 32 and rock the actuating rods 30 in a forward direction. The lower ends of the rods pass through the head 23 of the second fork so that a forward movement of the rods 30 will slide the second fork forwardly and project its tines 24 through the front end 25ª of the swinging frame 25, to enter the said tines beneath the material picked up by the fork 20. Thus the front 25ª of the frame 25 forms a retaining back for the tines 24 of the second fork. The continued forward movement of the actuating rods 30, after the second fork has reached the limit of its forward movement will cause an upward swinging movement of the hanger frame 25 to the position indicated in dotted lines, Fig. 1, for dumping the load carried by the second fork. Means are provided, as hereinafter described, for conveying the dumped load to a wagon (not shown) to be run alongside the apparatus. Upon release of the hollow shaft 32, a retractile spring 45 pulls the rods 30 downwardly, thereby withdrawing the second fork to the retracted position on the frame 25, and the said frame will be free to drop to the lower position for the second fork to take another load from the pick-up fork.

I prefer to provide guiding means for the frame 25 in its swinging movements, and to that end, arcuate guides 46 are provided on the frame 10, at each side, and brackets 47 on said swinging frame are formed with slots 48, receiving ribs 46ª on the guides 46, said guides being preferably of T-iron as shown best in Fig. 3.

In order to cushion the drop of the swing frame and second fork, an oil cushion is provided, there being cylinders 49 mounted on the frame 10, operating in which are pistons 50. A link 51 is pivoted to the pistons and to an arm 52, which is pivoted at 52ª on the frame 10, the free end of the arm being connected as by a chain 53, to the frame 25. The arrangement is such that as the frame 25 approaches the upper position it will lift the pistons 50, and before approaching the lower position the chains 53 will be checked in their downward movement by their connection with the arms 52, and will permit the swinging frames to lower only as the pistons lower in their cylinders 49.

To carry transversely the load dumped by the second fork, and deliver the same to a wagon to be hauled alongside of the machine, an overhead traveling conveyer 54 is provided, of any suitable construction, here shown as traveling over a table 55. Any suitable motor 56 on the frame 10 has driving connection with the worm 29 and with the traveling conveyer. As here shown, a belt 57 runs from the motor shaft to the shaft 58 on which the worm wheel 29 is secured, and from the shaft 58 a belt 59 runs to a shaft 60 having driving pulleys or sprockets 61 to actuate the belts 62 of the conveyer 54.

In operation, as will be understood from the foregoing, if the clutch 34 is out of engagement it may be released by the driver by a movement of the lever 37, and will be automatically thrown into engagement with the worm wheel by the spring 33ª whenever it is desired to raise the lifting fork 23, 24, to dump a shock of hay or grain into the conveyer 54. The lifting of the fork 23, 24 and its frame 25 will automatically release the clutch through the trip 43, causing the second fork to be retracted to the rearmost position by the spring 45, and permitting the swinging frame 25 to drop. The clutch will be held out of engagement by the pawl 37ª and ratchet teeth 37ᵇ until the driver releases the pawl by throwing the lever 37.

The described construction affords a practical means for carrying my invention into effect, and I would state in conclusion that I do not limit myself strictly to the mechanical details herein illustrated, since manifestly the same can be considerably varied without departure from the spirit of the invention.

Having thus described my invention, I claim as new and desire to secure by Letters Patent:

1. A loader of the class described, including a vehicle, a pick-up fork, a sliding fork movable forwardly to the pick-up fork to take material therefrom, a swinging frame for lifting the loaded sliding fork, and a unitary means actuating the sliding fork and finally actuating the swinging frame together with the loaded sliding fork.

2. In a loader of the class described, a vehicle, a pick-up fork, a swinging frame, a sliding fork on said frame movable forwardly to the pick-up fork to take material therefrom and into lifting engagement with the swinging frame, and rockable actuating means engaging the second fork to slide the same forwardly and into engagement with the swinging frame, said actuating means after moving the sliding fork into engagement with the swinging frame, having a continued movement to lift the said swinging frame with the loaded sliding fork.

3. In a loader of the character described, a vehicle adapted to be drawn over a field, a pick-up fork thereon, a transverse shaft above and in the rear of the pick-up fork, a frame hung at its upper end on the said shaft to swing thereon, said frame having an upwardly extending front end, a fork slidable on the said frame to project its tines through said upwardly projecting front end into position to take material from the pick-up fork, and swinging actuating means depending from said shaft and engaging the slidable fork to project the same forwardly, the said actuating means being movable through an arc after moving the fork whereby to swing the frame and the fork thereon upwardly through an arcuate path after the fork has been moved to the forward position.

4. In a loader of the character described, a vehicle, a pick-up fork thereon, a transverse shaft, a frame hung on said shaft, a sliding fork on said frame, a swinging actuating device on said shaft, means to connect and disconnect said swinging actuating means and shaft, said actuating device having engagement with the sliding fork to shift the same forwardly, and said frame having stop means to limit the forward movement of the fork, the actuating device having movement in an arcuate path to lift the frame and its fork after sliding said fork, and curved guide elements on the vehicle with which elements the said frame has guided engagement.

5. In a loader of the class described, a vehicle, a pick-up fork, a frame in the form of a hanger pivoted at its upper end, a second fork slidable on the lower portion of the hanger frame to take material from the pick-up fork and lift the said frame, and means acting on the second fork to slide the said second fork to the pick-up fork, and into lifting engagement with the pivoted frame to swing the said frame and the loaded sliding fork upwardly.

6. In a loader of the class described, a vehicle, a pick-up fork, a swinging frame in the rear of the pick-up fork, a second fork slidable on the swinging frame to take material from the pick-up fork and into lifting engagement with the said frame, and actuating means acting on the second fork to slide the same to the pick-up fork and against the swinging frame, said actuating means being movable through an angle to raise the swinging frame and the loaded sliding fork therewith after said sliding fork has been moved against the said frame.

7. In a loader, a pick-up fork, a movable frame, a second fork on the frame to take material from the pick-up fork, means for raising the frame, and cushioning means to cushion the drop of the movable frame, said cushioning means comprising a fluid cylinder, a piston, and operating connections between the piston and movable frame.

8. In a loader, a pick-up fork, a swinging frame in the rear of the pick-up fork, a second fork slidable on the frame to take material from the pick-up fork, rockable rods having sliding engagement with the second fork, and means for rocking said rods to slide the second fork and then lift the swinging frame.

9. In a loader, a vehicle, a pick-up fork, a frame in the rear of the fork, the frame being formed with an upwardly extending front, a second fork slidable on the said frame to project its tines through the front of the frame whereby said front will form a retaining back for the sliding fork, and means for raising the said second fork and frame.

10. In a loader, a vehicle, means for gathering and raising shocks of hay or grain, running wheels on the vehicle, at the rear, draft devices for connection of draft animals, caster wheels at the front of the vehicle, and at the sides thereof, spindles on which said wheels are mounted, the said spindles extending upwardly to a height above the draft devices sufficient to receive a neck-yoke for the draft animals, and means at the upper ends of the respective spindles to connect neck members thereto.

In testimony whereof I have signed my name to this specification in the presence of two subscribing witnesses.

GUY H. TARVIN.

Witnesses:
ELLA WILDE,
E. J. TURNER.